United States Patent
Laycock et al.

(10) Patent No.: US 9,977,413 B2
(45) Date of Patent: May 22, 2018

(54) APPARATUS AND METHOD FOR MANAGING OPEN WINDOWS IN A GRAPHICAL DISPLAY FOR A REPRESENTATION OF A PROCESS SYSTEM

(71) Applicant: Honeywell International Inc., Morristown, NJ (US)

(72) Inventors: Graeme Laycock, Hunters Hill (AU); Rohan McAdam, Yetholme (AU); Stephen Coorey, Strathfield (AU); Benjamin Benardos, Eastwood (AU)

(73) Assignee: Honeywell International Inc., Morris Plains, NJ (US)

( * ) Notice: Subject to any disclaimer, the term of this patent is extended or adjusted under 35 U.S.C. 154(b) by 658 days.

(21) Appl. No.: 13/792,881

(22) Filed: Mar. 11, 2013

(65) Prior Publication Data
US 2014/0258916 A1  Sep. 11, 2014

(51) Int. Cl.
*G06F 3/048* (2013.01)
*G05B 19/042* (2006.01)
*G05B 23/02* (2006.01)
*G06F 3/0481* (2013.01)

(52) U.S. Cl.
CPC ....... *G05B 19/042* (2013.01); *G05B 23/0216* (2013.01); *G06F 3/0481* (2013.01); *G05B 2219/31472* (2013.01); *G05B 2219/31475* (2013.01); *G05B 2219/36137* (2013.01); *G05B 2219/36147* (2013.01); *G06F 2203/04806* (2013.01)

(58) Field of Classification Search
None
See application file for complete search history.

(56) References Cited

U.S. PATENT DOCUMENTS

| | | | |
|---|---|---|---|
| 4,574,364 A | 3/1986 | Tabata et al. |
| 5,060,170 A | 10/1991 | Bourgeois et al. |
| 5,075,675 A | 12/1991 | Barker et al. |
| 5,091,866 A | 2/1992 | Takagi |
| 5,390,295 A | 2/1995 | Bates et al. |
| 5,428,733 A | 6/1995 | Carr |

(Continued)

FOREIGN PATENT DOCUMENTS

| | | |
|---|---|---|
| DE | 10228200 A1 | 1/2004 |
| EP | 2386938 A2 | 11/2011 |

(Continued)

OTHER PUBLICATIONS

International Search Report dated Jun. 16, 2014 in connection with International Patent Application No. PCT/US2014/019757; 3 pages.

(Continued)

*Primary Examiner* — William Trapanese

(57) ABSTRACT

A method includes displaying a plurality of windows in a graphical display. Each window corresponds to a representation of at least a portion of an industrial process system. The method also includes, responsive to a first window being in an active state, subscribing to first operational data associated with the process system. The method further includes, responsive to a second window being in an inactive state, unsubscribing from second operational data associated with the process system.

22 Claims, 5 Drawing Sheets

(56) References Cited

U.S. PATENT DOCUMENTS

| | | |
|---|---|---|
| 5,487,143 A | 1/1996 | Southgate |
| 5,561,757 A | 10/1996 | Southgate |
| 5,576,946 A | 11/1996 | Bender et al. |
| 5,576,964 A | 11/1996 | Choate |
| 5,631,825 A | 5/1997 | van Weele et al. |
| 5,657,463 A | 8/1997 | Bingham |
| 5,675,755 A | 10/1997 | Trueblood |
| 5,734,380 A | 3/1998 | Adams et al. |
| 5,745,759 A | 4/1998 | Hayden et al. |
| 5,794,018 A | 8/1998 | Vrvilo et al. |
| 5,796,403 A | 8/1998 | Adams et al. |
| 5,825,360 A | 10/1998 | Odam et al. |
| 5,874,960 A | 2/1999 | Mairs et al. |
| 5,880,725 A | 3/1999 | Southgate |
| 5,896,138 A | 4/1999 | Riley |
| 5,943,236 A | 8/1999 | Ohno et al. |
| 6,002,400 A | 12/1999 | Loring et al. |
| 6,031,530 A | 2/2000 | Trueblood |
| 6,065,138 A | 5/2000 | Gould et al. |
| 6,329,984 B1 | 12/2001 | Boss et al. |
| 6,473,660 B1 | 10/2002 | Thibault |
| 6,509,915 B2 | 1/2003 | Berman et al. |
| 6,570,595 B2 | 5/2003 | Porter |
| 6,678,867 B2 | 1/2004 | Fong et al. |
| 6,708,211 B1 | 3/2004 | Tingley et al. |
| 6,724,406 B1 | 4/2004 | Kelley |
| 6,760,048 B1 | 7/2004 | Bates et al. |
| 6,832,271 B1 | 12/2004 | Ivan et al. |
| 6,873,345 B2 | 3/2005 | Fukuda et al. |
| 6,901,560 B1 | 5/2005 | Guerlain et al. |
| 6,975,914 B2 | 12/2005 | DeRemer et al. |
| 7,024,626 B2 | 4/2006 | Ko |
| 7,242,991 B2 | 7/2007 | Budinger et al. |
| 7,249,326 B2 | 7/2007 | Stoakley et al. |
| 7,342,594 B1 | 3/2008 | Ort et al. |
| 8,169,643 B2 | 5/2012 | Yamada |
| 8,312,384 B2 | 11/2012 | Gibson et al. |
| 8,589,814 B2 | 11/2013 | Pandurangan et al. |
| 8,860,728 B2 | 10/2014 | Cupitt et al. |
| 2002/0055968 A1 | 5/2002 | Wishoff et al. |
| 2003/0016206 A1 | 1/2003 | Taitel |
| 2003/0028269 A1* | 2/2003 | Spriggs ............... G05B 15/02 700/83 |
| 2003/0135087 A1 | 7/2003 | Hickle et al. |
| 2003/0217053 A1 | 11/2003 | Bachman et al. |
| 2003/0217054 A1 | 11/2003 | Bachman et al. |
| 2003/0220707 A1 | 11/2003 | Budinger et al. |
| 2003/0225462 A1 | 12/2003 | Bachman et al. |
| 2003/0225469 A1 | 12/2003 | DeRemer et al. |
| 2004/0002950 A1 | 1/2004 | Brennan et al. |
| 2004/0111194 A1 | 6/2004 | Wie |
| 2006/0036962 A1* | 2/2006 | Jobs et al. ............... 715/765 |
| 2006/0070008 A1 | 3/2006 | Sauve et al. |
| 2006/0206825 A1 | 9/2006 | Dorn et al. |
| 2007/0106954 A1 | 5/2007 | Porter |
| 2007/0132779 A1 | 6/2007 | Gilbert et al. |
| 2007/0161125 A1 | 7/2007 | Rosenfeld et al. |
| 2008/0010608 A1 | 1/2008 | Adams |
| 2008/0077844 A1 | 3/2008 | Kim et al. |
| 2008/0244449 A1 | 10/2008 | Morrison et al. |
| 2009/0132954 A1 | 5/2009 | Cupitt |
| 2009/0249205 A1 | 10/2009 | Yoshimura et al. |
| 2011/0115816 A1 | 5/2011 | Brackney |
| 2011/0258568 A1 | 10/2011 | Pandurangan et al. |
| 2012/0030616 A1 | 2/2012 | Howes et al. |
| 2012/0206393 A1 | 8/2012 | Hillis et al. |
| 2012/0232875 A1 | 9/2012 | Devereux |
| 2012/0254792 A1* | 10/2012 | Husoy ............... G06F 3/0481 715/782 |

FOREIGN PATENT DOCUMENTS

| | | |
|---|---|---|
| EP | 2503419 A2 | 9/2012 |
| JP | 4347779 A | 12/1992 |
| WO | WO 99/63430 | 12/1999 |
| WO | WO 00/10077 | 2/2000 |
| WO | WO 03/089995 A2 | 10/2003 |
| WO | WO 2004/032392 A2 | 4/2004 |
| WO | WO 2008/063928 A2 | 5/2008 |
| WO | WO 2008/118891 A2 | 10/2008 |

OTHER PUBLICATIONS

Written Opinion dated Jun. 16, 2014 in connection with International Patent Application No. PCT/US2014/019757; 6 pages.
International Search Report dated Dec. 27, 2007 in connection with International Patent Application No. PCT/US2007/072440; 2 pages.
Written Opinion dated Dec. 27, 2007 in connection with International Patent Application No. PCT/US2007/072440; 5 pages.
International Search Report dated Oct. 6, 2011 in connection with International Patent Application No. PCT/US2011/029290; 3 pages.
Written Opinion dated Oct. 6, 2011 in connection with International Patent Application No. PCT/US2011/029290; 4 pages.
International Search Report dated Oct. 4, 2011 in connection with International Patent Application No. PCT/US2011/029919; 3 pages.
Written Opinion dated Oct. 4, 2011 in connection with International Patent Application No. PCT/US2011/029919; 4 pages.
Non-Final Rejection dated Jul. 22, 2008 in connection with U.S. Appl. No. 11/481,362, now U.S. Publication No. 2008/0010608 Al; 10 pages.
Final Rejection Jan. 22, 2009 in connection with U.S. Appl. No. 11/481,362, now U.S. Publication No. 2008/0010608 Al; 14 pages.
Advisory Action dated Apr. 6, 2009 in connection with U.S. Appl. No. 11/481,362, now U.S. Publication No. 2008/0010608 Al; 3 pages.
Non-Final Rejection dated Jun. 23, 2009 in connection with U.S. Appl. No. 11/481,362, now U.S. Publication No. 2008/0010608 Al; 15 pages.
Final Rejection dated Dec. 24 2009 in connection with U.S. Appl. No. 11/481,362, now U.S. Publication No. 2008/0010608 Al; 18 pages.
Advisory Action dated Mar. 10, 2010 in connection with U.S. Appl. No. 11/481,362, now U.S. Publication No. 2008/0010608 Al; 3 pages.
Non-Final Rejection dated Nov. 10, 2010 in connection with U.S. Appl. No. 11/481,362, now U.S. Publication No. 2008/0010608 Al; 17 pages.
Final Rejection dated Apr. 14, 2011 in connection with U.S. Appl. No. 11/481,362, now U.S. Publication No. 2008/0010608 Al; 19 pages.
Advisory Action dated Apr. 14, 2012 in connection with U.S. Appl. No. 11/481,362, now U.S. Publication No. 2008/0010608 Al; 2 pages.
Non-Final Rejection dated Mar. 1, 2013 in connection with U.S. Appl. No. 12/754,446, now U.S. Pat. No. 8,860,728; 28 pages.
Final Rejection dated Sep. 13, 2013 in connection with U.S. Appl. No. 12/754,446, now U.S. Pat. No. 8,860,728; 30 pages.
Non-Final Rejection dated Nov. 26, 2013 in connection with U.S. Appl. No. 12/754,446, now U.S. Pat. No. 8,860,728; 30 pages.
Final Rejection dated Mar. 21, 2014 in connection with U.S. Appl. No. 12/754,446, now U.S. Pat. No. 8,860,728; 39 pages.
Non-Final Rejection dated May 17, 2013 in connection with U.S. Appl. No. 12/762,185, now U.S. Pat. No. 8,589,814; 7 pages.
"Experion PKS with PMD Controller HMIWeb Technology User Interface"; Honeywell International Inc.; Mar. 2008; 5 pages.
Supplementary European Search Report dated Dec. 23, 2016 in connection with European Patent Application No. EP 14 77 8498.

* cited by examiner

APPARATUS AND METHOD FOR MANAGING OPEN WINDOWS IN A GRAPHICAL DISPLAY FOR A REPRESENTATION OF A PROCESS SYSTEM

TECHNICAL FIELD

This disclosure relates generally to process control systems and more specifically to an apparatus and method for managing open windows in a graphical display for a representation of a process system.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

One typical function of process control systems is the ability to provide effective tools for operators to monitor and control industrial processes. These tools often include process schematics that graphically illustrate the industrial processes being controlled. In many cases, the process schematics for a large industrial process are divided into sections, so operators need to open multiple displays or windows and navigate amongst a large number of open displays or windows to monitor and control the industrial processes.

SUMMARY

This disclosure provides an apparatus and method for managing open windows in a graphical display for a representation of a process system.

In a first embodiment, a method includes displaying a plurality of windows in a graphical display. Each window corresponds to a representation of at least a portion of an industrial process system. The method also includes, responsive to a first window being in an active state, subscribing to first operational data associated with the process system. The method further includes, responsive to a second window being in an inactive state, unsubscribing from second operational data associated with the process system.

In a second embodiment, an apparatus includes at least one processing device configured to generate a graphical display having a plurality of windows. Each window corresponds to a representation of at least a portion of an industrial process system. The at least one processing device is also configured, responsive to a first window being in an active state, to subscribe to first operational data associated with the process system. The at least one processing device is further configured, responsive to a second window being in an inactive state, to unsubscribe from second operational data associated with the process system.

In a third embodiment, a non-transitory computer readable storage medium includes instructions that, when executed by at least one processing device, cause the at least one processing device to perform the following steps. A graphical display having a plurality of windows is generated. Each window corresponds to a representation of at least a portion of an industrial process system. Responsive to a first window being in an active state, first operational data associated with the process system is subscribed to. Responsive to a second window being in an inactive state, second operational data associated with the process system is unsubscribed from.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
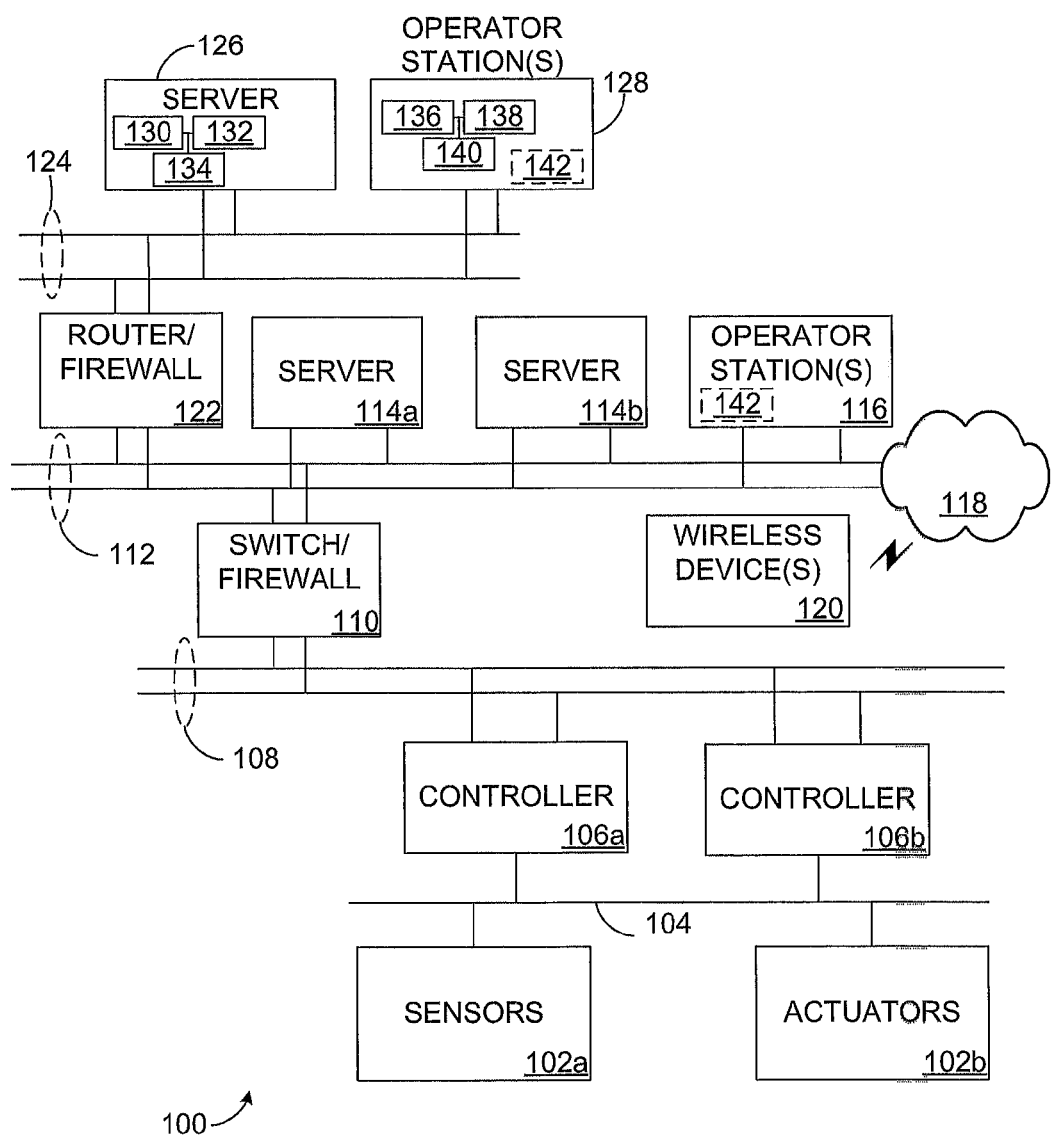
FIG. 1 illustrates an example process control system according to this disclosure.
Figure 2A:
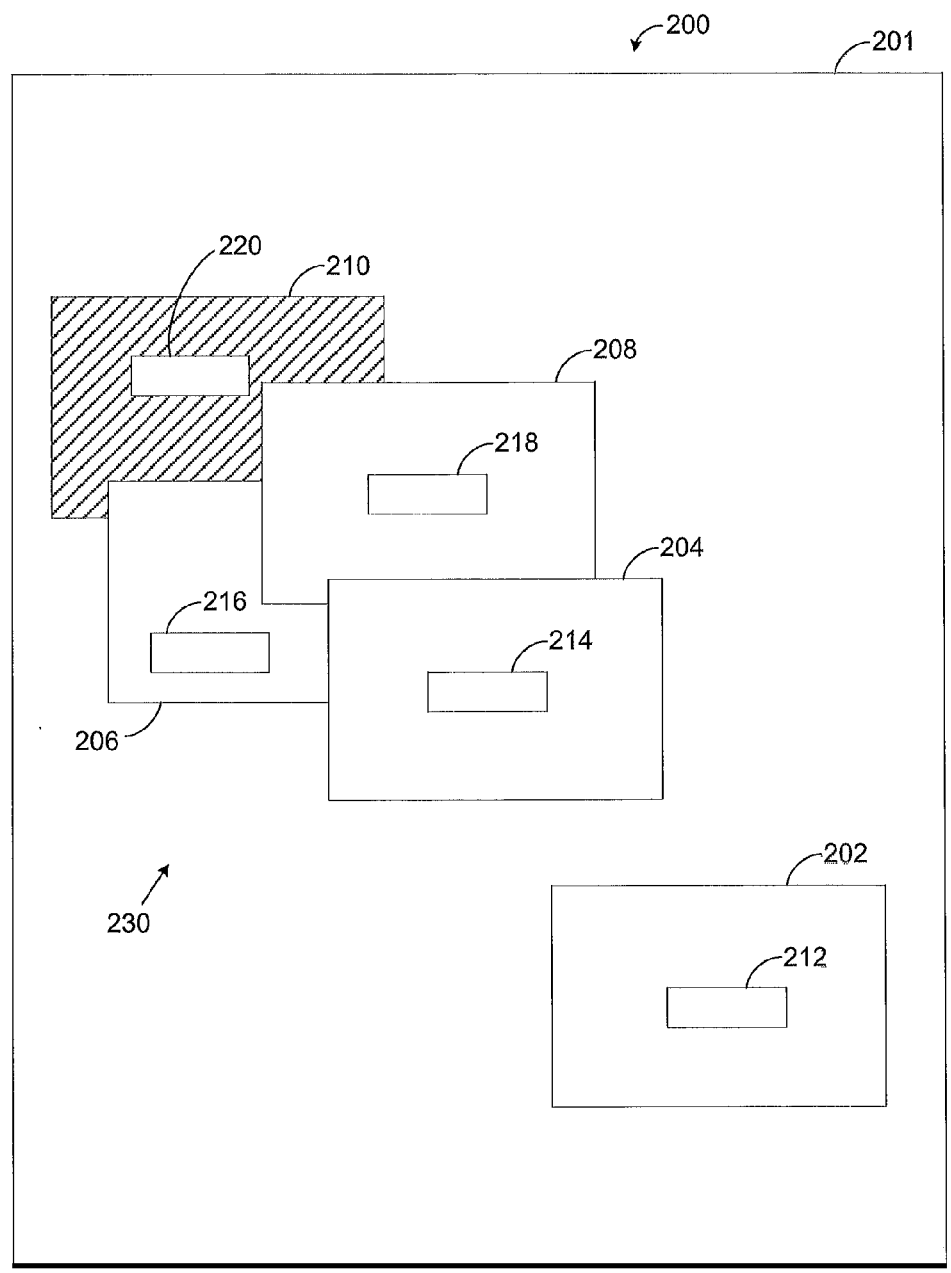
FIGS. 2A through 2C illustrate example graphical displays that include multiple open windows for representation of a process system according to this disclosure.
Figure 2B:
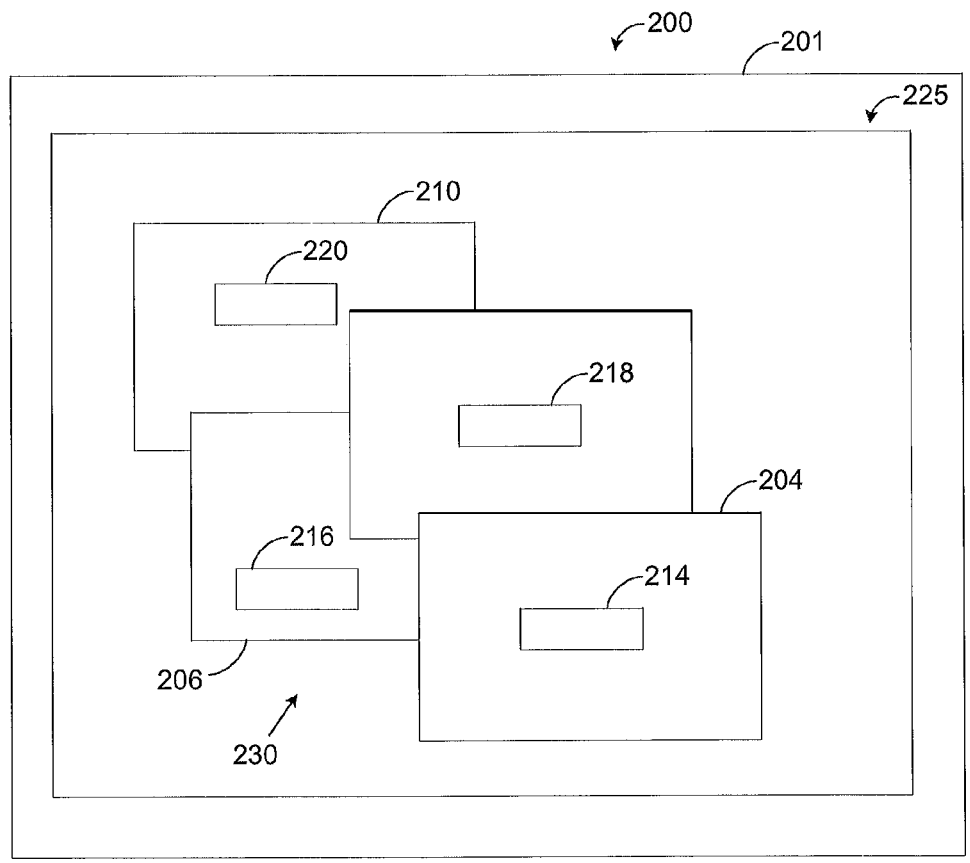
Figure 2B:
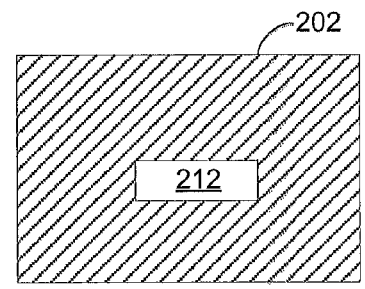
Figure 2C:
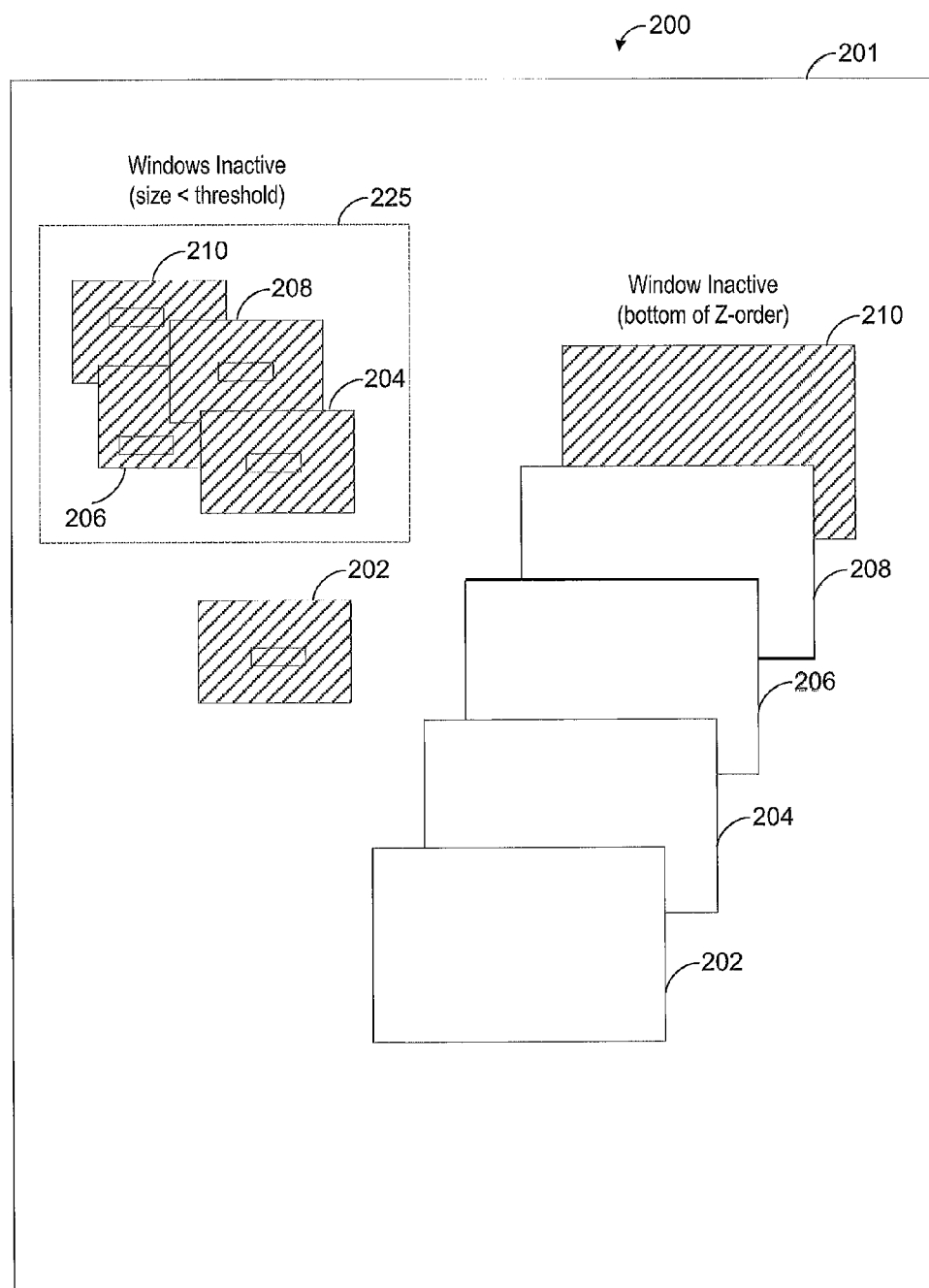
Figure 3:
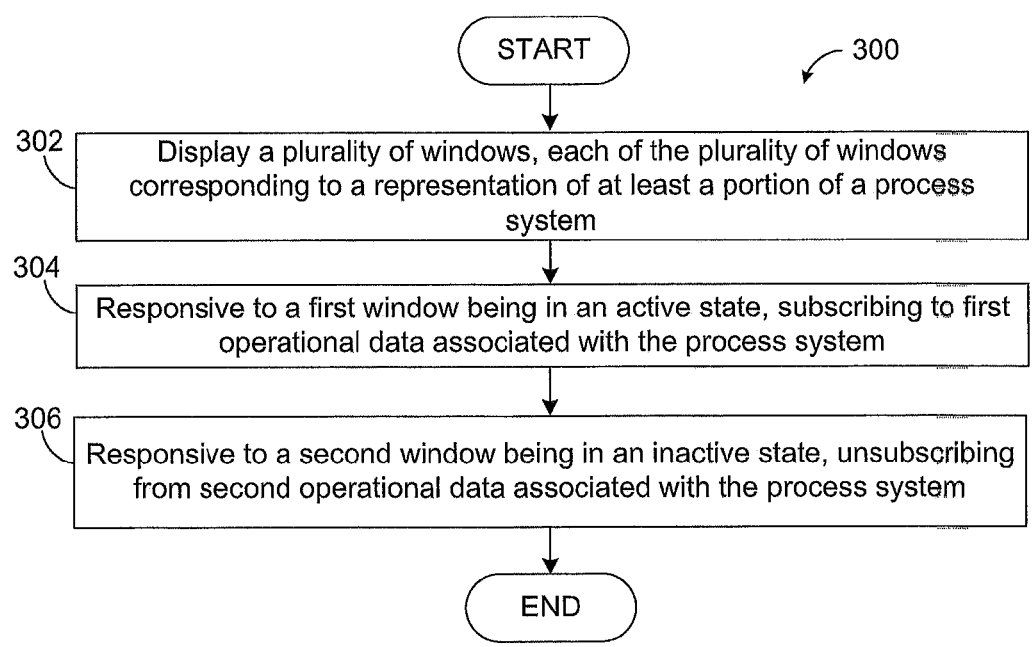
FIG. 3 illustrates an example method for managing open windows in a graphical display for a representation of a process system according to this disclosure.

FIGS. 1 through 3, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

FIG. 1 illustrates an example process control system 100 according to this disclosure. In this example embodiment, the process control system 100 includes various components that facilitate production or processing of at least one product or other material, such as one or more sensors 102*a* and one or more actuators 102*b*. The sensors 102*a* and actuators 102*b* represent components in a process system that may perform any of a wide variety of functions. For example, the sensors 102*a* could measure a wide variety of characteristics in the process system, such as temperature, pressure, or flow rate. In addition, the actuators 102*b* could alter a wide variety of characteristics in the process system, such as heaters, motors, catalytic crackers, or valves. The sensors 102*a* and actuators 102*b* could represent any other or additional components in any suitable process system. Each of the sensors 102*a* includes any suitable structure for measuring one or more characteristics in a process system. Each of the actuators 102*b* includes any suitable structure for operating on or affecting one or more conditions in a process system. Also, a process system may generally represent any system or portion thereof configured to process one or more products or other materials in some manner.

At least one network 104 is coupled to the sensors 102*a* and actuators 102*b*. The network 104 facilitates interaction with the sensors 102*a* and actuators 102*b*. For example, the network 104 could transport measurement data from the sensors 102*a* and provide control signals to the actuators 102*b*. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

Two controllers 106*a*-106*b* are coupled to the network 104. The controllers 106*a*-106*b* may, among other things, use the measurements from the sensors 102*a* to control the operation of the actuators 102*b*. For example, the controllers 106a-106b could receive measurement data from the sensors 102a and use the measurement data to generate control signals for the actuators 102b. Each of the controllers 106a-106b includes any suitable structure for interacting with the sensors 102a and controlling the actuators 102b. The controllers 106a-106b could, for example, represent multivariable controllers or other types of controllers. As a particular example, each of the controllers 106a-106b could represent a computing device running a MICROSOFT WINDOWS operating system.

Two networks 108 are coupled to the controllers 106a-106b. The networks 108 facilitate interaction with the controllers 106a-106b, such as by transporting data to and from the controllers 106a-106b. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

Two servers 114a-114b are coupled to the networks 112. The servers 114a-114b perform various functions to support the operation and control of the controllers 106a-106b, sensors 102a, and actuators 102b. For example, the servers 114a-114b could log information collected or generated by the controllers 106a-106b, such as measurement data from the sensors 102a or control signals for the actuators 102b. The servers 114a-114b could also execute applications that control the operation of the controllers 106a-106b, thereby controlling the operation of the actuators 102b. In addition, the servers 114a-114b could provide secure access to the controllers 106a-106b. Each of the servers 114a-114b includes any suitable structure for providing access to, control of, or operations related to the controllers 106a-106b. Each of the servers 114a-114b could, for example, represent a computing device running a MICROSOFT WINDOWS operating system.

One or more operator stations 116 are coupled to the networks 112. The operator stations 116 represent computing or communication devices providing user access to the servers 114a-114b, which could then provide user access to the controllers 106a-106b (and possibly the sensors 102a and actuators 102b). As particular examples, the operator stations 116 could allow users to review the operational history of the sensors 102a and actuators 102b using information collected by the controllers 106a-106b and/or the servers 114a-114b. The operator stations 116 could also allow the users to adjust the operation of the sensors 102a, actuators 102b, controllers 106a-106b, or servers 114a-114b. In addition, the operator stations 116 could receive and display warnings, alerts, or other messages or displays generated by the controllers 106a-106b or the servers 114a-114b. Each of the operator stations 116 includes any suitable structure for supporting user access and control of the system 100. Each of the operator stations 116 could, for example, represent a computing device running a MICROSOFT WINDOWS operating system.

In this example, the system 100 also includes a wireless network 118, which can be used to facilitate communication with one or more wireless devices 120. The wireless network 118 may use any suitable technology to communicate, such as radio frequency (RF) signals. Also, the wireless devices 120 could represent devices that perform any suitable functions. The wireless devices 120 could, for example, represent wireless sensors, wireless actuators, and remote or portable operator stations or other user devices.

At least one router/firewall 122 couples the networks 112 to two networks 124. The router/firewall 122 includes any suitable structure for providing communication between networks, such as a secure router or combination router/firewall. The networks 124 could represent any suitable networks, such as a pair of Ethernet networks or an FTE network.

In this example, the system 100 includes at least one additional server 126 coupled to the networks 124. The server 126 executes various applications to control the overall operation of the system 100. For example, the system 100 could be used in a processing plant or other facility, and the server 126 could execute applications used to control the plant or other facility. As particular examples, the server 126 could execute applications such as enterprise resource planning (ERP), manufacturing execution system (MES), or any other or additional plant or process control applications. The server 126 includes any suitable structure for controlling the overall operation of the system 100.

One or more operator stations 128 are coupled to the networks 124. The operator stations 128 represent computing or communication devices providing, for example, user access to the servers 114a-114b, 126. Each of the operator stations 128 includes any suitable structure for supporting user access and control of the system 100. Each of the operator stations 128 could, for example, represent a computing device running a MICROSOFT WINDOWS operating system.

In particular embodiments, the various servers and operator stations may represent computing devices. For example, each of the servers 114a-114b, 126 could include one or more processors 130 and one or more memories 132 for storing instructions and data used, generated, or collected by the processor(s) 130. Each of the servers 114a-114b, 126 could also include at least one network interface 134, such as one or more Ethernet interfaces. Also, each of the operator stations 116, 128 could include one or more processors 136 and one or more memories 138 for storing instructions and data used, generated, or collected by the processor(s) 136. Each of the operator stations 116, 128 could also include at least one network interface 140, such as one or more Ethernet interfaces.

In one aspect of operation, to facilitate control over a process system, the operator stations 116, 128 may include one or more human-machine interface (HMI) applications 142. An HMI application 142 generally represents an application that generates graphical displays for presenting content to operators. The graphical displays visually represent one or more processes (or portions thereof) being monitored and/or controlled by the operators. An HMI application 142 can present any suitable graphical data to an operator, such as a process schematic that graphically illustrates a process to be controlled.

A user may want to open a large number of windows to call up and view various process schematics representative of portions of an industrial process or plant. Opening a large number of windows may pose challenges for a process control system. For example, the amount of data required to populate a large number of open windows may overload downstream data providers that may have low bandwidth.

To overcome these or other problems, the HMI application 142 can generate a graphical display containing process schematics that graphically illustrate equipment used to perform a particular process. Any other suitable graphical display with other content associated with a process system could be presented to an operator. The display can include a plurality of windows, each corresponding to a representation of at least a portion of the process. A user may be provided with the impression that they have a large number of windows open when in fact only a small number of windows are actually "active". First operational data associated with the process may be subscribed to in response to a first window being in an active state. Second operational data associated with the process may be unsubscribed from in response to a second window being in an inactive state. An example of a graphical display including multiple windows is shown in FIGS. 2A through 2C, which are described below.

Each HMI application 142 includes any suitable application for generating graphical displays representing at least part of a process being monitored and/or controlled. As a particular example, the HMI application 142 could use HMIWEB technology from HONEYWELL INTERNATIONAL INC. The HMIWEB technology uses hypertext markup language (HTML) and allows users to build process control displays (web pages) that are loaded onto operator stations 116, 128. The HTML displays may use INTERNET EXPLORER or other browser technology to extend the functionality of the web pages to allow process information to be displayed and to allow operators to control processes via the web pages. In particular embodiments, the HMI application 142 can operate within a larger system, such as within EXPERION systems from HONEYWELL INTERNATIONAL INC.

Although FIG. 1 illustrates one example of a process control system 100, various changes may be made to FIG. 1. For example, a control system could include any number of sensors, actuators, controllers, servers, operator stations, networks, and HMI applications. Also, the makeup and arrangement of the process control system 100 in FIG. 1 is for illustration only. Components could be added, omitted, combined, or placed in any other suitable configuration according to particular needs. In addition, FIG. 1 illustrates one operational environment in which managing open windows in a graphical display for a representation of a process system can be used. This functionality could be used in any other suitable device or system.

FIGS. 2A through 2C illustrate an example graphical display 200 for representation of an industrial process system according to this disclosure. The graphical display 200 could be generated, for example, by the HMI application 142 in order to present information associated with an industrial process system being controlled by the process control system 100.

The graphical display 200 includes a number of open windows (including windows 202-210) provided by one or more applications. An open window may include any window that has been instantiated, although an open window need not be displayed on-screen. An open window can be obscured behind one or more other open windows that are displayed on-screen, or an open window can be positioned off-screen. The open windows may be ordered according to a Z-order of the windows (such as an order resembling the order in which the windows were accessed). For example, the graphical display 200 in FIG. 2A is illustrated with multiple open windows 204-210 overlapping each other displayed on a screen 201. The windows 202-210 are shown in a Z-order orientation. In FIG. 2A, the window 202 is higher in the Z-order than the windows 204-210. The window 204 is higher in the Z-order than the windows 206-210. The window 206 is higher in the Z-order than windows 208-210, and the window 208 is higher in the Z-order than the window 210. The window 210 is at the bottom of the Z-order in this example. In other embodiments, the open windows may be ordered according to the order in which each window was instantiated without regard as to when the windows were last accessed. Any other suitable window ordering could also be used.

The open windows displayed on the graphical display 200 are placed at various locations and may be panned or moved by the user, such as via a panning operation. For example, to move an open window, a user may click on the open window using a mouse or other pointer and may use a drag and drop method to move the open window. The user could also pass a pointer over the open window, click on another widget, tap on a touchscreen, perform a gesture (such as a swipe gesture or a pinch gesture), or use any other suitable input mechanism to move the open window. In addition, to move an open window, the screen 201 may be panned.

The open windows may also be resized such that the open windows and/or the contents therein can adopt different lateral dimensions, such as via a zoom operation. For example, to enlarge or shrink an open window and/or the contents therein, a user may position a pointer over the open window and click a mouse or tap a touchscreen. The user may also click on another widget, perform a gesture (such as a swipe gesture or a pinch gesture), engage a mouse wheel, or use any other suitable input mechanism to enlarge or shrink the open window and/or the contents therein.

Although five windows 202-210 are shown here, it should be understood that more or fewer windows may be open. Each of the windows 202-210 includes one or more indicia corresponding to operational data of the process system. For example, the windows 202-210 respectively include indicia 212-220. The indicia 212-220 may include visual indicia corresponding to a representation of at least a portion of the process system. The visual indicia may include text, an image, or any other data or combination thereof. For instance, the visual indicia may include text and/or a schematic representation of operational data associated with sensors, actuators, other industrial equipment, graphical user interfaces (GUIs) corresponding to the operational data, dynamic operational data, or any combination thereof. The operational data may also include data that is associated with the process system itself, such as sensor data or the like.

The open window that has been most recently accessed can be assigned the top display priority among all open windows in the graphical display 200. For example, if the user opens a new window (such as a previously unopened window), the new window can become the most current active window of the graphical display 200 and be the window with which the user interacts and that receives the user's primary attention. As a particular example, the new window can be brought to the foreground of the graphical display 200, and the window that was previously the most current active window may recede to the background of the graphical display 200. If the user selects an open window that is already displayed on the graphical display 200, the selected open window can become the "new" most current active window of the graphical display 200 and be the window with which the user interacts and that receives the user's primary attention. In some implementations, visual effects showing the transition into the foreground and/or the background can be implemented (such as by animation or changes in color and shades of the windows as the windows go in and out of the foreground).

The impact of opening a large number of windows may be managed by providing the user with the impression that he or she has a large number of windows open when, in fact, only a small number of windows are actually "active". As used here, an "active" window represents a window that is open and that is subscribing to real-time data from an underlying system, and an "inactive" window represents a window that is open and that is not subscribing to real-time data from an underlying system. An inactive window may be represented by a static thumbnail, and/or a visual cue may be provided to a user to recognize an active window from an inactive window (such as by animation or changes in color and shades of the windows). Visual effects showing the transition from an active window to an inactive window or from an inactive window to an active window can also be implemented (such as by animation or changes in color and shades of the windows as the windows go from active to inactive or from inactive to active).

In some embodiments, the activation/inactivation of a window can be based, at least in part, on whether the number of active open windows exceeds a threshold number of active open windows. For example, once a threshold number of active open windows is reached and the user opens a new window, an existing active window may be deactivated so that the new window may be activated.

To illustrate, referring to FIG. 2A, assume that the threshold number of active open windows is four and that windows 204-210 are currently active windows displayed on the screen 201. If the user opens a new window (such as the window 202) to bring the total number of open windows to five, the new window 202 is activated, and one of the existing active windows (such as the window 210) is deactivated. The inactive window 210 in this example may continue to be displayed on the screen 201, and a visual cue may be provided to the user to recognize that the window 210 is an inactive window. The deactivation of one or more active windows may be based on the Z-order of the open windows, the order in which each open window was instantiated, or any other suitable order.

An inactive window may be re-activated by a simple user gesture, such as clicking on or tapping the inactive window. For example, the inactive window 210 in FIG. 2A may be re-activated and brought to the top of the Z-order. In that case, the window that is currently at the bottom of the Z-order (such as the window 208) would then be deactivated.

The graphical display 200 may additionally support a panning operation and/or a zooming operation. In that case, the number of active open windows may be managed based, at least in part, on whether a particular window is within a current view region of the graphical display 200. For example, any window that moves outside a current view region and/or that moves off screen due to the panning operation or the zooming operation may be deactivated. To illustrate, if the user zooms into a particular region of the graphical display 200, such as the region 230 of FIG. 2A, the windows 204-210 may be within a current view region 225 and be displayed on the screen 201 as shown in FIG. 2B. The window 202 may be outside the current view region 225 and may move off the screen 201 as shown in FIG. 2B. In that case, the windows 204-210 are active, and the window 202 is inactive.

The window 202 may be reactivated as the user pans the screen 201 to move the window 202 on-screen and to be within the current view region 225. Reactivation of the window 202 may invoke the threshold number of active open windows mechanism discussed above with reference to FIG. 2A, causing one or more active windows to become inactive.

The number of active open windows may further be managed based, at least in part, on whether a particular window is within the current view region 225 and whether the window satisfies a threshold pixel size. For example, the user may zoom out from a particular region of the graphical display 200 in which windows have been opened. In this case, the open windows reduce in size due to the zoom operation. Once an open window reaches a threshold size, it can be deactivated. To illustrate, if the user zooms out of a particular region of the graphical display 200 (such as the region 230 of FIG. 2B), the active windows 204-210 that are within the current view region 225 are reduced in size. In addition, the inactive window 202 that is outside of the current view region 225 is reduced in size. If one or more of the active windows 204-210 have been reduced in size and reach the threshold size, the window is deactivated as shown in FIG. 2C. In this case, the inactive windows 202-210 may be reactivated by zooming back into the region of the graphical display area in which they were originally opened as shown in FIG. 2C. Reactivation of the windows 202-210 may invoke the threshold number of active open windows mechanism discussed above with reference to FIG. 2A, causing one or more active windows to become inactive.

Although FIGS. 2A through 2C illustrate one example of a graphical display 200 that includes multiple windows for representation of a process system, various changes may be made to FIGS. 2A through 2C. For example, the process system shown here is for illustration only, and any other suitable process system can be displayed. Also, the sizes and positions of certain features, such as the relative positions and sizes of the windows 202-210, can be changed.

FIG. 3 illustrates an example method 300 for providing a graphical display including multiple windows for a representation of a process system according to this disclosure. The method 300 could, for example, be used by the HMI application 142 in the process control system 100 of FIG. 1 to present a graphical display, such as the graphical display 200 of FIGS. 2A through 2C.

A plurality of windows is displayed, where each window corresponds to a representation of at least a portion of an industrial process system, at step 302. For example, the HMI application 142 of FIG. 1 may generate the graphical display 200 of FIGS. 2A through 2C, which can be displayed at any of the operator stations 116, 128 of FIG. 1.

First operational data associated with the process system is subscribed to, responsive to a first window being in an active state, at step 304. The first window can become active in any suitable manner. For example, if a user opens a new window, such as the window 202 of FIG. 2A, the new window 202 may become active and may subscribe to real-time data from an underlying system. As another example, an inactive window may be re-activated, such as when the inactive window 210 in FIG. 2A is re-activated based on user activation. As yet another example, an inactive window may be re-activated based on a panning operation. For instance, the window 202 in FIG. 2B may be re-activated as the user pans the screen 201 to move the window 202 on-screen and to be within the current view region 225. In addition, an inactive window may be re-activated based on whether the inactive window is within a current view region and whether the inactive window satisfies a threshold pixel size. For example, the active windows 204-210 that are within the current view region 225 in FIG. 2C are enlarged in size based on a zooming operation and are activated as shown in FIG. 2C. The windows 202-210 of FIGS. 2A through 2C may be displayed at any of the operator stations 116, 128 of FIG. 1.

Second operational data associated with the process system is unsubscribed from, responsive to a second window being in an inactive state, at step 306. The second window can become inactive in any suitable manner. For example, if the user opens a new window and the number of active windows exceeds a threshold number, one of the existing active windows (such as the window 210 of FIG. 2A) may become inactive and become unsubscribed from real-time data from an underlying system. As another example, an active window may be deactivated based on a zooming operation. For instance, the window 202 in FIG. 2B may be deactivated in response to a zooming operation moving the window 202 off the screen 201 and the window 202 being outside the current view region 225. In addition, an active window may be deactivated based on whether the active window is within a current view region and whether the active window satisfies a threshold pixel size. For example, the active windows 204-210 that are within the current view region 225 in FIG. 2B can be reduced in size based on a zooming operation and deactivated as shown in FIG. 2C. The windows 202-210 of FIGS. 2A through 2C may be displayed at any of the operator stations 116, 128 of FIG. 1.

Although FIG. 3 illustrates one example of a method 300 for providing a graphical display that includes multiple open windows for a representation of a process system, various changes may be made to FIG. 3. For example, while shown as a series of steps, various steps shown in FIG. 3 could overlap, occur in parallel, occur in a different order, or occur multiple times. Moreover, some steps could be combined or removed and additional steps could be added according to particular needs.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware or a combination of hardware and software/firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    initiating, by a processing device, display of a plurality of windows in a graphical display, each of the windows corresponding to a representation of at least a portion of an industrial process system;
    responsive to a first of the windows transitioning into an active state, subscribing, by the processing device, to first operational data of a plurality of operational data associated with the industrial process system to begin receiving real-time data related to measurements from a first sensor of a plurality of sensors of the industrial process system; and
    responsive to a second of the windows transitioning into an inactive state, unsubscribing, by the processing device, from second operational data of the plurality of operational data associated with the industrial process system to stop receiving real-time data related to measurements from a second sensor of the plurality of sensors of the industrial process system, wherein transitioning the second window into the inactive state reduces an amount of the plurality of operational data requested, by the processing device, from the plurality of sensors.

2. The method of claim 1, further comprising:
    transitioning a third of the windows into the active state.

3. The method of claim 2, wherein transitioning the third window comprises transitioning a previously unopened window into the active state.

4. The method of claim 2, wherein transitioning the third window comprises transitioning a previously opened window that is currently in the inactive state into the active state.

5. The method of claim 2, wherein transitioning the third window comprises activating the third window based on at least one of: a pan operation and a zoom operation.

6. The method of claim 2, wherein transitioning the third window is based on at least one of:
    the third window being within a current view of the graphical display; and
    the third window having a pixel size above a threshold size.

7. The method of claim 1, further comprising:
transitioning the second window into the inactive state.

8. The method of claim 7, wherein transitioning the second window into the inactive state comprises deactivating the second window based on at least one of: a pan operation and a zoom operation.

9. The method of claim 7, wherein transitioning the second window is based on the second window having a pixel size below a threshold size.

10. The method of claim 7, wherein
the second window in the inactive state is displayed in the graphical display when the second window in the inactive state is within a current view of the graphical display.

11. The method of claim 7, wherein transitioning the second window into the inactive state is based on a total number of windows in the active state exceeding an active window threshold.

12. The method of claim 7, wherein transitioning the second window into the inactive state is based on the second window being outside a current view of the graphical display.

13. An apparatus comprising:
at least one processing device configured to:
generate a graphical display having a plurality of windows, wherein each window of the plurality of windows corresponds to a representation of at least a portion of an industrial process system;
responsive to a first of the windows being in an active state, subscribe to first operational data of a plurality of operational data associated with the industrial process system to begin receiving real-time data related to measurements from a first sensor of a plurality of sensors of the industrial process system, and
responsive to a second of the windows being in an inactive state, unsubscribe from second operational data of the plurality of operational data associated with the industrial process system to stop receiving real-time data related to measurements from a second sensor of the plurality of sensors of the industrial process system, wherein transitioning the second window into the inactive state reduces an amount of the plurality of operational data requested from the plurality of sensors.

14. The apparatus of claim 13, wherein the at least one processing device is further configured to transition a third of the windows into the active state.

15. The apparatus of claim 14, wherein the at least one processing device is configured to transition the third window into the active state by at least one of:
activating a previously unopened window; and
activating a previously opened window that is currently deactivated.

16. The apparatus of claim 14, wherein the at least one processing device is configured to transition the third window into the active state based on at least one of:
the third window being within a current view of the graphical display; and
the third window having a pixel size above a threshold size.

17. The apparatus of claim 13, wherein the at least one processing device is further configured to transition the second window into the inactive state.

18. The apparatus of claim 17, wherein the at least one processing device is configured to transition the second window into the inactive state based on the second window having a pixel size below a threshold size.

19. The apparatus of claim 17, wherein the at least one processing device is further configured to:
display the second window in the inactive state in the graphical display when the second window in the inactive state is within a current view of the graphical display.

20. A non-transitory computer readable storage medium comprising instructions that, when executed by at least one processing device, cause the at least one processing device to:
generate a graphical display having a plurality of windows, wherein each window of the plurality of windows corresponds to a representation of at least a portion of an industrial process system;
responsive to a first of the windows being in an active state, subscribe to first operational data of a plurality of operational data associated with the industrial process system to begin receiving real-time data related to measurements from a first sensor of a plurality of sensors of the industrial process system, and
responsive to a second of the windows being in an inactive state, unsubscribe from second operational data of the plurality of operational data associated with the industrial process system to stop receiving real-time data related to measurements from a second sensor of the plurality of sensors of the industrial process system, wherein transitioning the second window into the inactive state reduces an amount of the plurality of operational data requested from the plurality of sensors.

21. The non-transitory computer readable storage medium of claim 20, further comprising instructions that, when executed by the at least one processing device, cause the at least one processing device to transition the second window into the inactive state based on the second window having a pixel size below a threshold size.

22. The non-transitory computer readable storage medium of claim 20, further comprising instructions that, when executed by the at least one processing device, cause the at least one processing device to transition a third of the windows into the active state based on at least one of:
the third window being within a current view of the graphical display; and
the third window having a pixel size above a threshold size.

* * * * *